Patented Sept. 2, 1952

2,609,387

UNITED STATES PATENT OFFICE 2,609,387

REMOVAL OF AMINE INHIBITORS FROM UNSATURATED MONOMERS

Costas H. Basdekis, Springfield, and Elwood F. Jackson, Ludlow, Mass., assignors to Monsanto Chemical Company, St. Louis, Mo., a corporation of Delaware No Drawing. Application December 1, 1948,
Serial No. 62,972

7 Claims. (Cl. 260—486)

This invention relates to unsaturated monomeric materials. More particularly, the invention relates to a method for removing inhibitors from polymerizable monomers.

Polymerizable unsaturated compounds generally tend to polymerize at temperatures above 0° C. so that they may not be stored or shipped safely unless they contain polymerization inhibitors. The inhibitors must be removed prior to polymerization since they slow down the polymerization process, have a marked and generally deleterious effect on the degree of polymerization, and often tend to cause discoloration of the polymer.

Among the most frequently used inhibitors are amines, including aromatic and aliphatic amines, which may be either primary, secondary, or tertiary. These inhibitors may be removed from the monomers by distillation or by washing with acids. In both of these methods, about 10% of the monomeric material is wasted due to premature polymerization, chemical reaction, and the difficulty of complete recovery. In addition, distillation columns are expensive to set up and maintain.

It is an object of this invention to provide a process for removing inhibitors from monomeric, unsaturated polymerizable materials.

A further object is to provide a process for removing amine type inhibitors from unsaturated monomers.

These and other objects are attained by treating the unsaturated monomeric material containing an amine as a polymerization inhibitor with a cation exchange resin.

The following examples are given in illustration and are not intended as limitations on the scope of this invention. Where parts are mentioned, they are parts by weight.

Example I

A commercial cation exchange resin prepared by sulfonating a styrene-divinyl benzene copolymer was packed in a glass column and washed with methanol until the resin was substantially anhydrous. Liquid styrene monomer containing 100 parts of dicyclohexylamine per million parts of styrene was passed through the column. About 40 volumes of inhibited monomer were passed through 100 volumes of resin each minute of the test. No amine could be detected in the effluent from the column until about 1700 volumes of inhibited monomer had passed therethrough. After the resin was exhausted, it was easily regenerated by washing with methanol, followed by 1N aqueous hydrochloric acid. The residual hydrochloric acid and water were washed out with methanol and a second run of inhibitor monomer through the resin was made. The regenerated resin showed no loss of efficiency in the second run.

Example II

A different commercial cation exchange resin prepared by sulfonating phenol-formaldehyde resin was packed in a glass column and washed with methanol. Methyl acrylate containing 2500 parts of amyl amine per million parts of methyl acrylate was passed through the resin at a rate equal to 40 volumes of inhibited monomer per 100 volumes of resin. No amine could be detected in the effluent from the column until about 1000 volumes of inhibited monomer had passed therethrough. This resin was also easily regenerated by a methanol wash, followed by a dilute hydrochloric acid wash and a final methanol wash. The regenerated resin was found to have lost substantially none of its efficiency in subsequent runs.

The process of this invention comprises the removal of amine type polymerization inhibitors from unsaturated monomers under substantially anhydrous conditions, the removal being accomplished by passing the unsaturated monomers containing amine inhibitors over a cation exchange resin. In the process, the amine inhibitors are quantitatively removed by the cation exchange resin, and the unsaturated monomer is recovered in substantially pure form. The quantitative removal of the inhibitor continues undiminished until the resins are substantially exhausted. The cation exchange resins may then be easily regenerated with dilute acids preceded by a methanol wash to remove residual monomer and followed by a methanol wash to remove residual acid and water.

The monomeric materials which may be freed from inhibitor by the process of this invention are unsaturated polymerizable materials containing no free acid groups and no free basic groups, having greater affinity for the resin than the amine inhibitor. The compounds include unsaturated hydrocarbons, unsaturated ethers, unsaturated esters, unsaturated aldehydes and unsaturated ketones. Unsaturated acids will react with amines so that amines cannot be used to stabilize them. Unsaturated amines, amides and imides may not be purified by this process unless the basic group of the monomer has less affinity for the cation exchange resin than does the amine inhibitor. Examples of particular compounds which may me freed from the amine inhibitors are vinyl aromatic hydrocarbons such as styrene and its ring-substituted and side-chain substituted derivatives, divinyl benzene, trivinyl benzene, vinyl naphthalene, divinyl naphthalene, vinyl diphenyl, etc.; vinyl esters such as vinyl acetate, vinyl butyrate, vinyl stearate; vinyl ketones such as methyl vinyl ketone, ethyl vinyl ketone, methyl isopropenyl ketone; vinyl ethers such as methyl vinyl ether, ethyl vinyl ether, butyl vinyl ether, methyl isopropenyl ether; vinyl halides such as vinyl chloride, vinyl bromide, vinyl fluoride, etc.; unsaturated aldehydes such as acrolein, methacrolein, ethacrolein, etc.; esters and nitriles of acrylic and alpha-substituted acrylic acids; allyl derivatives corresponding to the above-mentioned vinyl derivatives; vinylidene compounds; conjugated polyenes including dienes and trienes such as butadiene, isoprene, dimethyl butadiene, piperylene and their derivatives such as chloroprene, cyanoprene, etc. If the monomeric materials are gaseous at room temperatures, they may be freed from amine inhibitors by conducting the process of this invention at superatmospheric pressures or at temperatures at which the monomers are liquid.

Inhibitors which may be removed by the process of this invention are primary, secondary and tertiary aliphatic, aromatic and cyclic amines. Included among such inhibitors are propyl amine, butyl amine, amyl amine, diethyl amine, dibutyl amine, dioctyl amine, di-2-ethyl hexyl amine, diamyl amine, triamyl amine, dioctylethyl amine, dioctylbenzyl amine, aniline, toluidine, xylidene, cyclohexyl amine, dicyclohexyl amine, pyridine and derivatives thereof such as the picolines, lutidines, etc., quinolines, etc., and alcohol amines such as the ethanol amines. These inhibitors are used in the unsaturated monomeric materials in proportions ranging from 10–3000 parts per million of monomer.

Cation exchange resins are generally water-insoluble solids containing acidic groups or radicals such as carboxylic acid and sulfonic acid groups or radicals. They are not necessarily acidic in the sense of giving to water in contact therewith, a pH value of less than 7. However, these acidic radicals, in the presence of water, react readily with bases such as the amines to form water-insoluble salts thereof. Examples of cation exchange resins are: sulfated lignins; sulfated peat; tannin-formaldehyde resins; tannins resinified with strong inorganic acids such as sulfuric acid, phosphoric acid or organic sulfonic acids; resins derived from monohydric and polyhydric phenols and aldehydes which are further modified with sulfurous acid, sulfites, bisulfites, sulfur dioxide, aromatic sulfonic acids such as cresyl sulfonic acid, amino carboxylic acids such as the amino acids derived from proteins and including glycine, alanine, glutamic acid, aspartic acid, arginine, histidine, hydroxyproline, proline, leucine, tyrosine, tryptophane, etc., semi-amides of polycarboxylic acids including oxamic acid, maleamic acid, phthalamic acid, succinamic acid, adipic monoamide, citric diamide, tricarballylic monoamide or diamide, naphthalic monoamide, partial amides of polymerized acrylic and alpha-substituted acrylic acids, etc., and nitroureas including N-substituted nitroureas such as N-methyl nitrourea, N-ethyl nitrourea, N-propyl nitrourea, N-isopropyl nitrourea, N-allyl nitrourea, N-furyl nitrourea, N-cyclohexyl nitrourea, etc.; furfural resinified with sulfites and an aldehyde or with an inorganic acid halide, such as sulfuryl chloride or phosphorous oxychloride, with or without a second aldehyde; aminoplasts modified with sulfites or bisulfites including the sulfited reaction products of an aldehyde with urea, thiourea, N-substituted ureas, dicyandiamide, ammeline, thioammeline, thioammeline ethers, alkyl ammelines, diamino diazines, triamino triazines such as melamine, etc.; sulfated natural and synthetic rubbers; copolymers of styrene, maleic anhydride and unconjugated polyenes such as allyl, substituted allyl, crotyl, propargyl, etc., esters of acrylic and alpha-substituted acrylic acids, diallyl and di($\beta$-alkallyl) esters of saturated and unsaturated dibasic acids, divinyl benzene, divinyl ether, diallyl ether, and polyhydric alcohol polyesters of acrylic and alpha-substituted acrylic acids; copolymers of acrylic and alpha-substituted acrylic acids with non-conjugated polyenes with or without a monoolefinic compound such as vinyl and allyl derivatives including vinyl and allyl esters of saturated monobasic acids; etc. The only limitation on the type of cation exchange resin is that it must be insoluble in the monomeric material being treated. The resins do not absorb or retain any significant amount of unsaturated monomeric material, do not discolor the unsaturated material, nor do they cause it to polymerize.

When the cation exchange resins are exhausted, they may be regenerated by washing them first with methanol to remove residual monomer, then with an aqueous acid, and finally with methanol to remove water and residual acid. Hydrochloric acid is preferred for economic reasons, but other acids may be used.

The rate at which the inhibited monomer is passed over the resin may be varied widely depending in part on the size and shape of the container used to confine the resin, on the size and shape of the resin particles, on the manner in which the resin is packed, on the affinity of the resin for the inhibitor or the rate of the reaction therewith, etc.

The cation exchange resin and the monomeric material are in substantially anhydrous condition. The process of this invention does not depend upon the presence of water, nor on ionization in water to effect the removal of the inhibitor from the monomer.

The process of this invention provides a quick, inexpensive and rapid method for removing amine inhibitors from unsaturated monomeric material with substantially no loss of the monomeric material.

It is obvious that many variations may be made in the process of this invention without departing from the spirit and scope thereof as defined in the appended claims.

What is claimed is:

1. A process for the removal of amine polymerization inhibitors from unsaturated monomeric polymerizable materials, under substantially anhydrous conditions, which comprises passing the monomeric material containing the polymerization inhibitor over a cation exchange resin which is insoluble in the monomeric material.

2. A process as in claim 1 wherein the amine inhibitor is dicyclohexylamine.

3. A process as in claim 1 wherein the amine inhibitor is amyl amine.

4. A process as in claim 1 wherein the unsaturated monomer is styrene.

5. A process as in claim 4 wherein the amine inhibitor is dicyclohexylamine.

6. A process for the removal of an amine inhibitor from methyl acrylate, under substantially anhydrous conditions, which comprises passing the methyl acrylate containing the amine inhibitor over a cation exchange resin which is insoluble in the methyl acrylate.

7. A process as in claim 6 wherein the amine inhibitor is amyl amine.

COSTAS H. BASDEKIS.
ELWOOD F. JACKSON.

REFERENCES CITED

The following references are of record in the file of this patent:

UNITED STATES PATENTS

| Number | Name | Date |
|---|---|---|
| 2,375,164 | Bennett | May 1, 1945 |
| 2,387,824 | Block | Oct. 30, 1945 |

FOREIGN PATENTS

| Number | Country | Date |
|---|---|---|
| 805,092 | France | Aug. 17, 1936 |

OTHER REFERENCES

Myers: Ind. and Eng. Chem., vol. 35, pp. 858–863 (1943).

Getman et al.: "Outlines of Theoretical Chemistry," (John Wiley and Sons, New York, 1931, 5th edition), pp. 391 and 392.